F. W. YOUNG,

Assignor to K. S. EVANS.

SEED DROPPER.

No. 10,196. Reissued Sept. 12, 1882.

Attest.
M. M. Converse
P. H. Penfield

Inventor.
Frank W. Young
B. C. Converse Atty

N. PETERS, Photo-Lithographer, Washington, D. C.

UNITED STATES PATENT OFFICE.

FRANK W. YOUNG, OF SANTA ROSA, CALIFORNIA, ASSIGNOR TO K. S. EVANS, OF SPRINGFIELD, OHIO.

SEED-DROPPER.

SPECIFICATION forming part of Reissued Letters Patent No. 10,196, dated September 12, 1882.

Original No. 135,743, dated February 11, 1873; Reissue No. 5,529, dated August 5, 1873. Application for reissue filed January 28, 1882.

*To all whom it may concern:*

Be it known that I, FRANK W. YOUNG, a citizen of the United States, residing at Santa Rosa, in the county of Sonoma and State of California, have invented a new and useful Improvement in Seed-Droppers, of which the following is a specification.

My invention relates to improvements in a rotary seed-dropping device for planters.

My invention relates, further, to the means for operating the seed-dropping devices, whereby they are rendered more certain and reliable in their operation.

My invention consists, first, in a seed-dropping device in which the seed-disk is provided with seed-cells which can be conveniently adjusted to any desired size to suit the quantity of seed or number of grains required to be dropped at a time.

My invention consists, further, in a series of tangential arms pivoted to the cap or top disk over the seed-plate, whereby the adjustment in the size of all the seed-cells is made complete at the same time by a partial rotation of said cap in either direction, and also in retaining them in position, when adjusted, by clamping said cap and seed-disk together.

It further consists in the combination, with the slide-lever, of a pair of pawls pivoted thereon, which extend from either side to opposite sides of the seed-disk and engage with teeth upon the verge of the same, whereby an interrupted rotation is given to said seed by the movement of the lever.

It further consists of a spring interposed between the rear jaws of the pawls on the opposite sides of the pivot from their engaging ends, whereby said pawls are kept clamped to the seed-disk in engagement with the teeth thereof to render the operation of dropping certain.

Figure 1:
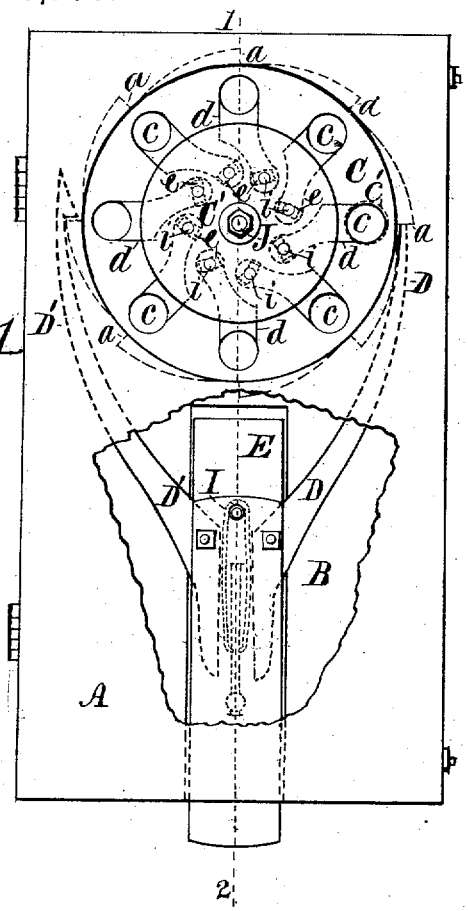
Figure 2:
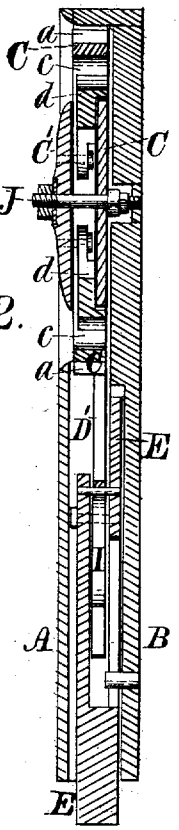
Figure 3:
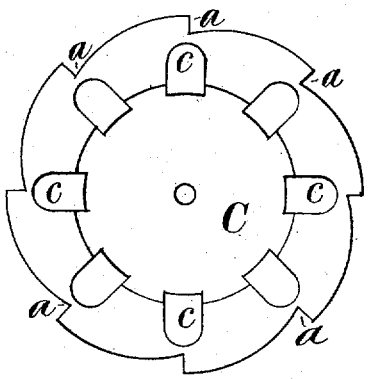
Figure 4:
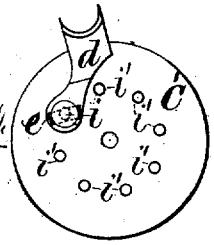

Figure 1 is a plan view of my seed-dropper, having a portion of the upper board broken away to give a view of the interior. Fig. 2 is a longitudinal section through line 1 2, Fig. 1. Fig. 3 is a detail view of the main seed-disk, and Fig. 4 is a detail view of the under side of the cap or upper disk with one of the adjustable arms pivoted thereto.

The bottom of my seed-hopper is double, consisting of the two boards A and B, between which is placed a seed wheel or disk, C, pivoted centrally to the lower bottom, B, upon the pivot-bolt J, extending upward therefrom. In the upper bottom, A, over the disk C, a round hole is made a little less in diameter than the disk, slightly overlapping the edge of the latter, so as to prevent the seed from getting between them into the interior space. The seed-wheel C has a circle of holes or slots, *c*, through it, near its outer edge, the outer parts of which form a half-circle. These holes or cells are open to receive the seed from the hopper, their lower ends only being closed by the bottom board, B, over which the disk is rotated, so that the seed in them cannot escape until it is carried by each cell successively over the discharge-hole *c'* in the bottom board, B, through which it is discharged to the ground. The middle part of the upper side of wheel C is recessed to receive the arms or levers *d* and accommodate their movements. These are made in about the form shown in Figs. 1 and 4, and are pivoted at their inner ends by bolts *i* to the under side of the cap-disk C', so that when the latter is turned in either direction they are drawn inward or pushed outward, thus enlarging or diminishing the size of the seed-holes *c* in the seed-disk C. The inner end of each arm is provided with a transverse slot, *e*, as shown in Figs. 1 and 4, and the bolt or pin *i*, which pivots the arm to the cap C', passes through this slot, which latter is requisite to allow of the proper movement of the arms in their retraction and extension when the disk C is partially rotated in either direction. The outer ends of the arms *d* enter the inner ends of the apertures *c* and are concaved to form the inner half of the seed-cells, so that the latter may be enlarged or diminished by the inward or outward movement of the arms. The cap-disk C' is pivoted upon the same bolt, J, with the seed-disk C, and, when adjusted, is clamped to said seed-disk by a nut screwed upon the upper end of the pivot-bolt, thus fastening the arms *d* firmly in the position to which they have been adjusted by the partial turning of the cap C'. Upon the edge of the disk C are formed as many ratchet-teeth *a* as there are seed-cells in it, as shown in Figs. 1 and 3. Two pawls, D and D′, extend from the slide-lever E, to which they are pivoted, to the opposite sides of the seed-disk, and engage with the teeth *a*, as seen in Fig. 1. The pawl D, on the right, is a push-pawl, and the pawl D′, on the left, is a pull-pawl, being formed with a hook on it to take hold of the teeth *a* as the slide-bar is thrust from the disk C. The slide-lever E (seen in Figs. 1 and 2) is reciprocated in the ordinary manner, and its end enters and is operated in a guide-groove in the space between the bottoms A and B. The movement of the slide-bar is so adjusted that the disk C will be rotated by the engaging-pawls a distance equal to the space between two consecutive seed-cells, so that each one will be brought successively over the discharge-hole *c′* at the end of the movement. The rear ends of the pawls D and D′ extend outward beyond the pivots, and between them is placed a spring of U or other shape, the pressure of which causes the forward or engaging ends of the pawls to be held against the teeth of the seed-disk and prevent their disengagement therefrom when operating the disk, as seen in the dotted lines, Fig. 1.

I claim as my invention—

1. In a seed-dropper, the combination, with a rotary disk having seed cells or holes, of a sliding bar adapted to operate said disk, and of means for adjusting all of said seed cells or holes to a larger or smaller size simultaneously, for the purpose set forth.

2. In a seed-dropper having a rotary seed-disk, a slide adapted to operate said seed-disk, in combination with a cap or disk pivoted upon said seed-disk, to the under side of which the tangential arms for adjusting the size of the seed-cells are pivoted, and means for fastening the two disks together after the cells are adjusted to retain said adjustment.

3. In a rotary seed-dropping device, the combination, with a seed-disk having adjustable seed-holes, a series of adjustable arms for reducing or enlarging said seed-holes, and a cap or disk pivoted upon the same bolt with the seed-disk, whereby the adjustment is effected, of means, substantially as described, for securing the cap, interposed arms, and disk together and fastening the adjustable parts in position.

4. In a rotary seed-dropper, a seed-disk having cells or holes made adjustable, and means for such adjustment, adapted to operate upon all the holes at the same time, whereby all the seed-cells are enlarged or reduced simultaneously by a single movement, as set forth.

5. The combination, with a seed-disk having a circle of adjustable seed-holes which can be adjusted simultaneously, of a pivot-bolt or its equivalent, forming the common bearing for both the seed-disk and the cap or upper disk, and provided with a nut for retaining the device in adjustment.

6. The arms *d d*, slotted and pivoted to the auxiliary cap or disk C′, in connection with a rotating dropping-disk pivoted upon the same center with the cap, and having adjustable seed-holes therein, whereby all of said seed-holes are simultaneously reduced or enlarged by a single movement of the upper disk, as specified.

7. The combination, with the pivoted seed-disk C, having the dropping-holes *c*, of the pivoted cap C′ and the interposed slotted arms *d d*, pivoted to the latter and adapted to adjust the capacity of all of said dropping-holes at the same time by a partial rotation of said cap in either direction.

8. In a rotary seed-dropper, a seed-disk having a circle of seed-holes therein operated by a slide-lever, in combination with a push and pull pawl pivoted thereto.

9. The combination, with the slide-bar and a seed-disk having teeth upon the edge of the same, of a pair of pawls pivoted to said slide-bar and engaging with the teeth of the disk, so as to rotate it from either side alternately by a push and a pull movement as the slide is reciprocated.

10. The combination, with a horizontal rotating seed-disk having teeth upon the edge of the same, of a pair of pawls pivoted at their rear ends to the slide-bar and extending to opposite sides of said disk and engaging with said teeth, for the purpose specified.

11. In a seed-dropper, the combination, with a seed-disk rotating in a horizontal plane and having teeth upon the verge of the same outside of the circle of seed-holes, of a slide-bar provided with a pair of pawls pivoted thereto, and adapted to operate in the same plane as the disk in engaging with the teeth of the same, for the purpose hereinbefore set forth.

12. The combination, with the seed-disk C, cap C′, and arms *d d*, of the reciprocating slide-bar E and pawls D D′, constructed to operate in the manner and for the purpose set forth.

13. The combination, with a rotary seed-disk having teeth upon the edge, of a spring, I, pawls D D′, and a slide for operating the whole.

FRANK W. YOUNG.

Attest:

ANGELO NOCE,
JOHN MCCORMICK.